United States Patent Office 3,338,917
Patented Aug. 29, 1967

3,338,917
DIIMIDAZOLINYLCARBANILIDE
Rudolf Fischer, Sandbuhl, Kehrsatz, near Bern, and Rudolf Hirt, Muri, near Bern, Switzerland, assignors to Dr. A. Wander, S.A., Bern, Switzerland, a Swiss corporation
No Drawing. Filed Dec. 6, 1966, Ser. No. 599,391
Claims priority, application Switzerland, Oct. 14, 1960, 11,547/60
2 Claims. (Cl. 260—309.6)

This is a continuation-in-part application of our co-pending patent application Ser. No. 144,294, filed on Oct. 11, 1961.

The invention relates generally to a class of new therapeutically useful substances. More specifically, the subject of the invention is a class of chemical compounds consisting of 3,3'-di-2-imidazolin-2-yl-carbanilide of the formula:

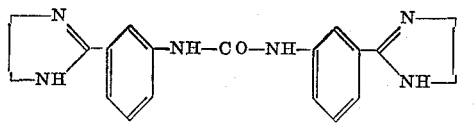

(I)

and therapeutically acceptable acid addition salts thereof.

It is known that 3,3'-diamidino-carbanilide and its acid addition salts are useful in the treatment of babesiosis caused in certain host animals by infection with protozoans of the Babesia family, such as Babesia divergens, Babesia bigemina and Babesia rodhaini.

It has now been found that the 3,3'-di-2-imidazolin-2-yl-carbanilide and its therapeutically acceptable acid addition salts are equally or even more active in combating babesiosis, and that they are furthermore active in combating infections caused by other genera of the Piroplasmidae family than Babesia, such as Theileria and Anaplasma, for instance, Theileria parva and Anaplasma marginale, against which the known 3,3'-diamidino-carbanilide and its acid addition salts do not show useful therapeutic activity. The compounds of the invention being also quick acting and of low toxicity, they are useful for the treatment of a broader range of Piroplasmidae infections and can often be administered in lower doses than the corresponding diamidino compounds.

The 3,3'-di-2-imidazolin-2-yl-carbanilide of Formula I is obtained by reacting 3-(2-imidazolin-2-yl)-aniline with carbonic acid or a reactive derivative thereof, respectively, such as phosgene.

A further method for preparing said compound consists in reacting 3,3'-dicyano-carbanilide first with ether hydrogen sulfide or alcoholic hydrochloric acid and then with ethylene diamine. The treatment with hydrogen sulfide may, for instance, be carried out in dimethylformamide solution in the presence of a strong base such as pyridine or triethylamine at room temperature. The dithioamide may be heated with an excess of ethylene diamine to about 110° C.

The compound of the invention can furthermore be obtained by treatment of a 3,3'-di(lower alkoxy)carbonyl-carbanilide with ethylene diamine, preferably in the presence of ammonium chloride, at increased temperature.

The compound of Formula I can be isolated in the form of the free base or may be converted into an acid addition salt by treatment with appropriate inorganic or organic acids, such as hydrochloric, hydrobromic, hydriodic, sulfuric, phosphoric, nitric, formic, acetic, propionic, butyric, tartaric, maleic, oxalic, citric, salicylic, methanesulfonic, isethionic and the like acids.

The invention includes within its scope pharmaceutical compositions comprising the compound of Formula I or preferably a pharmaceutically acceptable acid addition salt thereof, together with a pharmaceutical carrier which may be either a solid material or a liquid. In clinical or veterinary practice the compounds of this invention will preferably be administered by subcutaneous or intramuscular injection. Thus the preferred pharmaceutical compositions are those which are suitable for parenteral administration.

Pharmaceutical compositions for parenteral administration are preferably in the form of sterile solutions of readily soluble acid addition salts in water. However, sterile solutions in other suitable solvent media, or sterile suspensions of sparingly soluble salts in water, oil or other inert solvents can also be employed, with or without the addition of solid or liquid excipients.

Pharmaceutical compositions for oral administration can be liquids or solids, such as solutions, suspensions, emulsions, syrups, powders or tablets, using the customary excipients and diluents such as starch, lactose, stearic acid or magnesium stearate.

The amount of the compound of Formula I or its pharmaceutically acceptable acid addition salts, respectively, in the said pharmaceutical compositions may be varied in accordance with their nature and the intended use, it being desirable that the percentage of the active ingredient should constitute a proportion that a suitable dosage shall be obtained. A suitable dosage for the treatment of, for example, bovine redwater caused by infection of cattle with Babesia bigemina, is from 1 to 5 mg. of active ingredient per kilogram of weight of the animal to be treated. Infections caused by other protozoans of the Piroplasmidae family and/or in other animal species may successfully be treated using lower or higher dose levels of active ingredient.

*Example 1*

15 g. of 3-(2-imidazolin-2-yl)-aniline dihydrochloride and 30 g. of sodium acetate are dissolved in 150 ml. of water. Gaseous phosgene is introduced into the solution obtained until the diazo test becomes negative. The basic product is isolated by addition of soda lye to the reaction mixture and filtration thereof by suction. The residue is washed with water and dissolved in diluted acetic acid. The solution is clarified with the aid of charcoal and then treated with concentrated hydrochloric acid. A crystalline product is formed, which, after cooling to 0° C., is isolated by suction, washed successively with 10% aqueous hydrochloric acid, ethanol and ether, and then dried in vacuo at 50° C. In this way, 15 g. of 3,3'-di-2-imidazolin-2-yl-carbanilide dihydrochloride are obtained, showing a melting point of 350° C. (with decomposition).

*Example 2*

10 g. of 3,3'-di-2-imidazolin-2-yl-carbanilide dihydrochloride obtained in accordance with Example 1 are dissolved in an amount of distilled water sufficient to yield 100 ml. of aqueous solution. The latter is filled into ampoules which are sterilized in an autoclave. The preparation obtained is suitable for intramuscular injection in the treatment of animals suffering from babesiosis, theileriasis, or anaplasmosis, one injection of an appropriate amount of said solution being sufficient for complete recovery of the animals.

We claim:
1. A chemical compound of the class consisting of 3,3'-di-2-imidazolin-2-yl-carbanilide and its pharmaceutically acceptable acid addition salts.

2. 3,3'-di-2-imidazolin-2-yl - carbanilide dihydrochloride.

References Cited
UNITED STATES PATENTS
2,473,577  6/1949  De Groote et al. ____ 260—309.6

WALTER A. MODANCE, *Primary Examiner.*

N. TROUSOF, *Assistant Examiner.*